| United States Patent [19] | [11] Patent Number: 5,045,579 |
|---|---|
| Sugerman | [45] Date of Patent: Sep. 3, 1991 |

[54] SELECTIVE ABSORBENTS

[75] Inventor: Gerald Sugerman, Allendale, N.J.

[73] Assignee: Liquid Waste Corporation, Las Cruces, N. Mex.

[21] Appl. No.: 525,778

[22] Filed: May 18, 1990

[51] Int. Cl.$^5$ ............................ C08K 5/51; C08K 5/06
[52] U.S. Cl. .................................... 524/128; 524/116; 524/148
[58] Field of Search ............... 524/440, 441, 445, 128, 524/148, 116

[56] References Cited

U.S. PATENT DOCUMENTS 4,277,415  7/1981  Sugerman et al. .................. 524/128
4,417,009  11/1983  Sugerman et al. .................. 524/127

Primary Examiner—Paul R. Michl
Assistant Examiner—U. K. Rajguru
Attorney, Agent, or Firm—Darby & Darby

[57] ABSTRACT

The preparation and use of unique, environmentally benign, economical and selectively modified polynorbornene sponges are described as selective absorbents for hydrocarbons, their halogenated analogs and selected oxygenated derivatives thereof. The modified polynorbornene material contains organo-titanium phosphates or oligophosphates and is environmentally stable for extended periods, easy to use, efficient and absorbate-retentive. Exhausted product will not drip or exude absorbate under conventional landfill disposal conditions and will produce only minimal ash when incinerated.

15 Claims, No Drawings

SELECTIVE ABSORBENTS

BACKGROUND OF THE INVENTION

Particulate absorbents (e.g., talc, pearlite) have been used as liquid waste absorbents since ancient times. However, inorganic absorbents are generally virtually non-selective and hence unsuited to the selective absorption of organic material in the presence of water. This lack of selectivity makes them unsuitable for separating or recovering minor proportions of organic contaminants from aqueous systems, e.g., dioxins from stream beds or oil slicks from ponds, rivers and/or coastal waters.

Organic (polymeric) absorbents have not heretofore been widely used, despite their relatively selective absorption of organics, because of the low absorption rates displayed by larger, hard, non-elastomeric particulate and the tendency of small particular organics to be wind-dispersed as a consequence of their low bulk densities and/or specific gravity.

In recent years, elastomeric particulate material and plasticized (partially) aggregated elastomeric particulate have been found to provide a partial solution to the problem of absorbing limited quantities of organics in the presence of water, in undisturbed and agitated areas, respectively. However, most elastomers, with the notable exception of polynorbornene, have relatively low organics absorption limits, particularly if the resulting composite must resist leakage, i.e., bleeding, while undergoing compression during transport and/or in landfill disposal.

The success of polynorbornene in achieving certain of the ideals of an absorbent has been recently reported in the paper by L. M. Flaherty et al., "Sorbent Performance Study for Crude and Refined Petroleum Products" presented at the 1989 Oil Spill Conference, under the heading "Emerging Technologies" (pp. 155–160).

Despite its relatively selective absorption of organics, this polymer suffers from relatively rapid deterioration of its absorption capabilities under environmental exposure and the tendency of even lightly plasticized material to quickly agglomerate into large, low absorption rate accretions. The reason for this rapid and significant volumetric absorption capability loss upon exposure is unknown but may be related to air oxidation, accelerated by water and certain metals. Conventional antioxidants such as phenolics or hindered amines have proven partially successful in extending polynorbornene's useful life as a waste collector, but the leachability of such antioxidants and their high bioactivity limit their practical application.

BRIEF DESCRIPTION OF THE INVENTION

It has been surprisingly discovered that minor proportions of certain titanium organo-phosphates and/or oligophosphates, when added in conjunction with selected amounts of hydrocarbon plasticizers and preferably in the presence of hard resin(s), overcome both the storage and agglomeration limitations normally associated with the use of polynorbornene as an absorbent. This permits the production of storage stable, fast absorbing, easily handled, environmentally acceptable absorbents having controlled aggregation. These polymers may be formed into retaining structures, such as booms or pillows, or broadcast, as may be desired.

Furthermore, such absorbents are extremely resistant to leakage under compression and selectively absorb hydrocarbons, their halogenated analogs and derivatives thereof (such as dioxins) from aqueous environments, while not absorbing nutrients such as carbohydrates, alcohols and/or esters. The polynorbornenes of the invention rapidly absorb up to 10 parts by weight of liquid organics per part of absorbent to produce non-bleeding, low ash solids having excellent shelf life. This latter quality makes practical the maintenance of large quantities of such material near sites where oil spills are most likely, to facilitate emergency use, and the fabrication of spill collection devices in leak-prone areas. In addition to providing improved response time, the invention reduces the highly labor intensive work associated with clean-up operations.

DETAILED DESCRIPTION OF THE INVENTION

The polynorbornene compounds and their preparation are well known in the art. These are described in U.S. Pat. Nos. 3,676,390 and 4,020,021. Such polymers are marketed by Societe Chimique des Charbonnages of Courbevoie, France.

After compounding with the ingredients of the invention, the polymer may be formed into booms and pillows or used in a particulate form to absorb, solidify and contain oils, hydrocarbons, chlorinated solvents and PCBs. These absorbent materials comply with federal law and proposed EPA regulations for landfill disposal. They are not biodegradable and will not release free liquids under landfill pressure. The products of the invention may be used for spill protection indoors, outdoors and on water surfaces, as, for example, at electric utilities, railroads, airports, port authorities, aircraft manufacturers and mariners.

When fuel oil contacts the polymeric norbornene, it is absorbed into the polymer and the polymer swells considerably. After the complete absorption of the oil, the saturated polymer may be removed with little oil leakage. In less than two hours, it may be twisted and squeezed without the release of any oil. Where the polymer is formed into a boom, it can be used effectively for sheen removal from water, absorbing and solidying oils or chlorinated solvents on land or water, as a filter medium for the removal of oil from water, around machine bases that leak oil, and for the containment of spills on land or water. Such booms have the characteristics of fast absorption, hydrophilic behavior, indefinite shelf life, non-biodegradability, and buoyancy on water both before and after absorption and solidification. In addition, they can be incinerated or used in landfill. In contrast to other spill products, which release absorbed liquid under pressure, they will not solidify after absorption and do not retain their buoyancy.

The absorbents of the invention are excellent for absorbing heavy oil, light oil, aromatic and naphthenic processing oil, solvents such as carbon tetrachloride, chloroform, perchlorobenzene, dichlorobenzene, trichlorobenzene, transformer oil, domestic fuel oil, toluene and xylene. Good action efficiency is obtained with refrigerator oils, trichloroethene, biphenylether, tricresylphosphate, crude oil (aromatic light), naphtha, kerosene, petroleum, ether, creosote oils, benzene, ethylbenzene, trimethylbenzene and cyclohexane. Fair results are obtained with paraffinic processing oil, turbine oil, motor oil and turpentine, while only poor results are obtained with ethylether cutting oil, vegetable oil, dioctylphthalate and the $C_6$ through $C_{15}$ hydrocarbons.

Polymers made in the form of pillows may be used to absorb and solidify oils, chlorinated solvents, and PCBs. They are excellent for control and pick-up of oil spills on land and water. They may be used next to transformers or machinery leaking oil, over drains to capture oil spills or chlorinated solvents, to absorb oils that accumulate in puddles on dirt or hard surfaces, to remove oil from bilges in boats, to remove oil on water surfaces in tanks or contaminated areas and to solidify drips from oil tank lines. Particulate material can be used with other polymeric products for absorbing and solidying contained or puddled oils. They work on land and water regardless of temperature and have an indefinite shelf life. Generally these materials have volatiles and ash elements of under 0.5% each and are both non-toxic and hydrophobic.

The phosphato and diphosphato organo-titanates of the instant invention may be defined by the following formula:

where $A^1 = (RO)$ wherein each R is an alkyl, alkenyl or aralkyl group having less than 20 carbon atoms inclusive of up to 4 ether and/or halogen substituents;

$A^2 = -O(CR^1R^2)_b(CO)_cO-$ wherein each $R^1$ and $R^2$ is independently selected from hydrogen, alkyl, alkenyl, aralkyl or alkaryl groups or ether and/or halogen substituted derivatives thereof having less than 20 carbon atoms each;

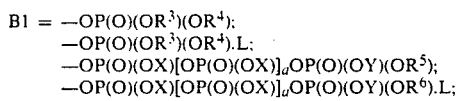

wherein $R^3$, $R^4$ and $R^5$ are each independently selected from among alkyl, alkenyl, aralkyl or alkaryl groups having less than 20 carbon atoms each inclusive of up to 3 ether and/or halogen substituents;

X and Y may each be chosen from among the same groups as $R^3$, $R^4$ and $R^5$ but where one of the X or a Y group may also be hydrogen;

L is a diester phosphite having not more than 40 carbon atoms per molecule; and $B^2$ is $-OP(O)(OR^3)OP(O)(OR^4)O-$ wherein $R^3$ and $R^4$ are as defined above.

Examples of these materials include:

TABLE A

| (I) | Titanium IV (bis-2,2-propenolatomethyl)butanolato, tris (dioctyl) phosphato-O |
|---|---|
| (II) | Titanium IV (bis-2,2-propenolatomethyl)butanolato, tris (dioctyl) diphosphato-O |
| (III) | Titanium IV bis(methyl, propyl) diphosphato-O, 2,3-bis phenoxymethyl-1-oxo-propanediolato, adduct with 1 mole of phenyl, 2-chloroethyl, hydrogen phosphite |
| (IV) | Titanium IV (dimethoxyethyl) cyclo diphosphato-0,0, (1-propoxyphenyl, 2-propyl) ethanediolato |
| (V) | Titanium IV (dibenzyl) cyclodiphosphato-0,0, oxoethylenediolato |
| (VI) | Titanium IV hexanolato, (methyl, phenyl, propyl) pentaphosphato-0,1,2-octane diolato, adduct with 1 mole of (butyl, benzyl) hydrogen phosphite |

TABLE A-continued

| (VII) | Titanium IV bis-neopentanolato, bis (octyl, octadecyl) phosphato-O |
|---|---|
| (VIII) | Titanium IV bis(diphenoxyethyl) diphosphato-0, 1,3-propanediolato, adduct with 1 mole of di(2-octadecenyl) hydrogen phosphite |
| (IX) | Titanium IV butanolato, (methyl, vinyl) cyclo diphosphato-0,0, (dioctyl) diphosphato-0, adduct with one mole of dimethyl, hydrogen phosphite |
| (X) | Titanium IV 2,4-dichlorophenylato, 2,3-pentanediolato, (tertiary butyl, vinyl) phosphato-O |

The preparation of the foregoing material will be obvious to those skilled in the art from U.S. Pat. Nos. 4,087,402; 4,122,062; and 4,277,415, the disclosures of which are incorporated herein by reference.

In the compositions of the invention, generally from 0.1 to 5 wt. %, based on the polymeric material of the organophosphatotitanates may be used. Hard resins added generally range from 0.1 to 25 wt. % of the polymer, preferably from 1 to 10. Examples of these materials include polymeric beads such as ethylene vinyl acetate low density polyethylene and polystyrene. Generally, the particle size should be from 0.1 to 3 mm, preferably from 1 to 3 mm. Other resinous materials which may be used include cellulose acetate, polyterpenes, rosin, polyesters, acrylics, polyamides, and copolymers thereof.

In contrast to the aforesaid resinous materials, soft inorganic-type compounds do not achieve the effect of increasing the rate of oil absorption. This is demonstrated by the data set forth in the examples below.

Examples of the hydrocarbon plasticizers which may be used include naphthenic, aromatic and terpene hydrocarbons and mixtures thereof having from about 150 to about 4000 mw units.

The amount of such plasticizers that should be used ranges from 10 to 45 wt. %, based on the polynorbornene present in the admixture. Preferably, from 15 to 35 parts are employed.

In order to incorporate the organo-titanates, plasticizer and the hard resin into the polynorbornene, any conventional type of mixing equipment may be used to thoroughly mix the particulate and liquid components into the polymer. Cement, ribbon, double arm, paddle, screw, planetary, or combinations thereof may be used. Mixers may be batch or continuous.

While not essential, other materials may be present in the polynorbornene. Examples of these are antioxidants, coloring agents, antiozonants, slip agents, tackifiers, perfumes and/or odormasks in amounts preferably not collectively exceeding about 5 wt. %.

EXAMPLE 1

This example teaches the use of phosphato and diphosphato organo-titanates to enhance the storage life and absorption speed of an oil-modified polynorbornene agglomerate.

One hundred parts by weight of polynorbornene flake were thoroughly wetted out and admixed in a planetary mixer with solutions of 0.2 part of the indicated titanium organophosphate in 30 parts of No. 2 fuel oil. The roman numerals correspond to those set forth in Table A above. The resultant aggregate (sponge) was partitioned into test samples for aging and absorption efficacy studies. Individual samples were either aged for 30 days at 93° C. (equivalent to about a year of storage at ambient) prior to testing or tested 48 hours after production.

The absorption tests were performed by exposing a flat uniform layer of 20 parts of loose sponge as a one-half inch layer on 100 parts by weight of test material in a metal container. After 30 minutes of exposure, residual oil (if any) was strained off and the resulting pick-up measured. Absorbate retentivity was measured by application of 3.3 atm. of pressure to the loaded absorbent and, after a one hour equilibration period, the bleed measured. The results are given in Table 1:

TABLE 1

| Test Sample Fresh/Aged | Additive PHR | Test* Liquid | 3 PBW Liquid Abs. Time | 30 Min. Pick-up PBW | Bleed PBW |
|---|---|---|---|---|---|
| F | None | P | >30 | 2.2 | 0.3 |
| A | None | P | >30 | 1.7 | 0.4 |
| F | None | N | 27 | 3.2 | 0.1 |
| A | None | N | >30 | 2.0 | 0.1 |
| F | None | D | 18 | 4.1 | 0.2 |
| A | None | D | >30 | 2.4 | 0.5 |
| A | None | N | 26 | 3.1 | 0.3 |
| F | I/0.2 | P | 21 | 4.0 | <0.1 |
| A | I/0.2 | P | 23 | 3.8 | <0.1 |
| F | I/0.2 | N | 19 | 4.5 | <0.1 |
| A | I/0.2 | N | 20 | 4.4 | <0.1 |
| F | I/0.2 | D | 17 | 5.0 | <0.1 |
| A | I/0.2 | D | 20 | 5.0 | <0.1 |
| F | II/0.1 | B | 17 | 5.0 | <0.1 |
| A | II/0.1 | B | 18 | 5.0 | <0.1 |
| F | III/0.5 | P | 20 | 5.0 | <0.1 |
| A | III/0.5 | P | 20 | 5.0 | <0.1 |
| F | IV/0.8 | N | 21 | 5.0 | <0.1 |
| A | IV/0.8 | N | 23 | 5.0 | <0.1 |
| F | IV/0.1 | N | 17 | 5.0 | <0.1 |
| A | IV/0.1 | N | 18 | 5.0 | <0.1 |

*P: 30' paraffinic oil
N: 100' naphthenic oil
D: dodecylbenzene
T: 1-bromotetrahydronaphthalene The above data clearly show that the rate of pick-up with the samples containing the compositions of the invention were considerably faster in each and every instance. In addition, in each instance, the compositions of the invention shows a bleed of less than 0.1 part by wt.

EXAMPLE 2

This example teaches the utility of minor proportions of hard resin particulate as an absorption rate enhance in polynorbornene sponge-based absorbents.

Seven parts by weight of polynorbornene flake were thoroughly admixed in a Hobart mixer with 2.5 parts of high boiling hydrogenated naphthenic oil, 0.5 part of the finely ground particulate solid indicated in Table 2, and 0.03 part of a neoalkoxy titanium (dioctyl) pyrophosphate (Compound I of Table A above).

The resulting aggregates were permitted to stand at ambient temperature for two weeks, then tested for absorption performance by broadcasting the samples onto a thoroughly agitated mixture of 100 parts of No. 4 fuel oil and 500 parts of salt water. After two hours, the sponge was collected, rinsed with salt water to remove surface contamination, and equilibrated for 24 hours at ambient temperature. It was then weighed and compression tested at 3.3 atm. The test results are given in Table 2:

TABLE 2

| Hard Particulate Tested* | 2 Hour Oil Absorption. PBW | Oil/Water Absorption Ratio | Compression Bleed. PBW |
|---|---|---|---|
| None | 6.7 | >99:1 | <0.1 |
| Talc | 7.7 | 8.3:1 | 0.4 |
| Calcite | 7.4 | 9.0:1 | 0.5 |
| EVA | 7.9 | >99:1 | <0.1 |
| LDPE | 7.5 | >99:1 | <0.1 |
| Polystyrene | 7.8 | >99:1 | <0.1 |

*EVA: ethylene vinylacetate
LDPE: low density polyethylene

These data clearly establish the efficacy of minor proportions of hard particulates as absorption enhancers for polynorbornene sponge. Further, the data show that organic particulate is substantially more effective than inorganics in effecting enhanced absorption of organics versus water and in minimizing compression-caused bleed of loaded absorbate.

What is claimed is:

1. An absorbent aggregate comprising particulate polynorbornene, hydrocarbon plasticizer, minor proportions of an organo-titanium phosphate or oligophosphate and optionally minor amounts of a hard resin particulate.

2. The absorbent aggregate of claim 1 wherein the organo-titanium phosphate or oligophosphate is present in an amount of from 0.1 to about 5.0 wt. % based on polynorbornene.

3. The absorbent aggregate of claim 1 wherein the hard resin content is from about 0.1 to about 25 wt. % based on polynorbornene.

4. An absorbent particulate prepared by thoroughly admixing polynorbornene with from about 10 to about 45 wt. % of a hydrocarbon plasticizer, from about 0.1 to about 5.0 wt. % of an organo-titanium phosphate or oligophosphate and optionally from about 0.1 to about 25 wt. % hard organic resin.

5. The absorbent aggregate of claim 1 wherein the organo-titanium compound has the formula:

$$A_a^1 TiB_{4-c}^1 \quad \text{(I)}$$
$$A_2^1 TiB_1^2 \quad \text{(II)}$$
$$A_1^1 TiB_1^2 B_1^1 \quad \text{(III)}$$
$$A_1^1 A_1^2 TiB^1 \quad \text{(IV)}$$
$$A_2^1 TiB_2^1 \quad \text{(V)}$$
$$A_1^2 TiB_1^2 \quad \text{(VI)}$$

where $A^1 = (RO)$ wherein each R is an alkyl, alkenyl or aralkyl group having less than 20 carbon atoms inclusive of up to 4 ether and/or halogen substituents;

$A^2 = -O(CR^1R2)_b(CO)_cO-$ wherein each $R^1$ and $R^2$ is independently selected from hydrogen, alkyl, alkenyl, aralkyl or alkaryl groups or ether and/or halogen substituted derivatives thereof having less than 20 carbon atoms each;

B1 = —OP(O)(OR³)(OR⁴);
—OP(O)(OR³)(OR⁴).L;
—OP(O)(OX)[OP(O)(OX)]_aOP(O)(OY)(OR⁵);
—OP(O)(OX)[OP(O)(OX)]_aOP(O)(OY)(OR^n).L;

wherein $R^3$, $R^4$ and $R^5$ are each independently selected from among alkyl, alkenyl, aralkyl or alkaryl groups having less than 20 carbon atoms each inclusive of up to 3 ether and/or halogen substituents;

X and Y may each be chosen from among the same groups as $R^3$, $R^4$ and $R^5$ but where one of the X or a Y group may also be hydrogen;

L is a diester phosphite having not more than 40 carbon atoms per molecule; and $B^2$ is $-OP(O)(OR^3)OP(O)(OR^4)O-$ wherein $R^3$ and $R^4$ are as defined above.

6. The absorbent aggregate of claim 5 wherein the organo-titanium compound is titanium IV (bis-2,2-propenolatomethyl)butanolato, tris (dioctyl) phosphato-O.

7. The absorbent aggregate of claim 5 wherein the organo-titanium compound is titanium IV (bis-2,2-propenolatomethyl)butanolato, tris (dioctyl) diphosphato-O.

8. The absorbent aggregate of claim 5 wherein the organo-titanium compound is titanium IV bis(methyl, propyl) diphosphato-O, 2,3-bis phenoxymethyl-1-oxopropanediolato, adduct with 1 mole of phenyl, 2-chloroethyl, hydrogen phosphite.

9. The absorbent aggregate of claim 5 wherein the organo-titanium compound is titanium IV (dimethoxyethyl) cyclo diphosphato-0,0, (1-propoxyphenyl, 2-propyl) ethanediolato.

10. The absorbent aggregate of claim 5 wherein the organo-titanium compound is titanium IV (dibenzyl) cyclodiphosphato-0,0, oxoethylenediolato.

11. The absorbent aggregate of claim 5 wherein the organo-titanium compound is titanium IV hexanolato, (methyl, phenyl, propyl) pentaphosphato-0,1,2-octane diolato, adduct with 1 mole of (butyl, benzyl) hydrogen phosphite.

12. The absorbent aggregate of claim 5 wherein the organo-titanium compound is titanium IV bis neopentanolato, bis (octyl, octadecyl) phosphato-O.

13. The absorbent aggregate of claim 5 wherein the organo-titanium compound is titanium IV bis (diphenoxyethyl) diphosphato-0, 1,3-propanediolato, adduct with 1 mole of di(2-octadecenyl) hydrogen phosphite.

14. The absorbent aggregate of claim 5 wherein the organo-titanium compound is titanium IV butanolato, (methyl, vinyl) cyclo diphosphato-0,0, (dioctyl) diphosphato-O, adduct with one mole of dimethyl, hydrogen phosphite.

15. The absorbent aggregate of claim 5 wherein the organo-titanium compound is titanium IV 2,4-dichlorophenylato, 2,3-pentanediolato, (tertiary butyl, vinyl) phosphato-O.

* * * * *